Figure 1:
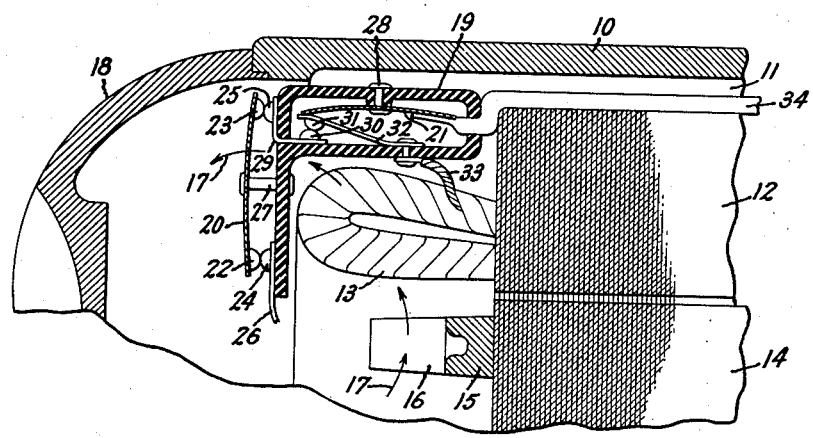

June 22, 1954     L. F. HEMPHILL ET AL     2,682,005
DYNAMOELECTRIC MACHINE OVERLOAD PROTECTION SYSTEM
Filed June 18, 1952

Inventors:
Lawrence F. Hemphill,
Marvin W. Sheets,
by Richard E. Hosley
Their Attorney.

Patented June 22, 1954

2,682,005

UNITED STATES PATENT OFFICE 2,682,005

DYNAMOELECTRIC MACHINE OVERLOAD PROTECTION SYSTEM

Lawrence F. Hemphill and Marvin W. Sheets, San Jose, Calif., assignors to General Electric Company, a corporation of New York Application June 18, 1952, Serial No. 294,134

6 Claims. (Cl. 310—68)

Our invention relates to dynamoelectric machines and particularly to dynamoelectric machine overload protection systems.

In connection with overload protection for dynamoelectric machines, it has heretofore been known to provide a single temperature responsive detector operating responsive to a combination of ambient temperature and to current either passing through the detector itself or through an associated heater resistor. For certain applications, however, such arrangements are unsatisfactory from the standpoint of imposing design limitations because the arrangements amount to a compromise between starting and running protection, and such arrangements as well as prior art arrangements using two detectors also renders difficult the assembly of machines of different ratings because a large variety of detector units or parts thereof must be stocked. Further with the prior art arrangements, variations in line voltage will usually adversely affect the running protection because the current values and winding temperatures depended upon during running do not have proper thermal lag characteristics.

It is an object of the present invention to provide simple and inexpensive means for overcoming the above-mentioned difficulties.

A further object of the present invention is to provide a dynamoelectric machine overload protection system which is superior with respect to removing existing design limitations, providing a maximum of standard units applicable over a considerable range of electric machine ratings, providing locked rotor protection, providing overload protection substantially independent of line voltage during running, and not requiring any complicated speed responsive switching mechanism.

In accordance with one aspect of our invention, we provide dual temperature responsive thermal protector units and eliminate the problem of disconnecting one unit or portion of a unit during running by causing one unit to be substantially disabled by arranging it responsive to ventilating medium by which it is cooled during running, and we eliminate the problem of providing sufficient thermal lag for the other unit by not only shielding it from the ventilating medium, but by having it operate directly responsive to heat in the machine core in contradistinction to the present practice of having such a unit operate directly responsive to ambient temperature, winding temperature or current. In the illustrated embodiments, a motor is provided with two disk thermal protectors, with one disk responsive to core temperature and the other disk responsive to motor current during starting but cooled by an air stream during running.

In the normal or "cold" position, the two disks connect contacts and operate as though they were in series to provide current to the motor, with the circuit to the motor interrupted whenever one disk or the other operates responsive to the overload for which it is provided, thereby to provide adequate overload protection for the motor during running and independent of line voltage changes, while at the same time providing adequate protection against locked rotor conditions.

The features of our invention which we believe to be novel are set forth with particularity in the appended claims. Our invention itself, however, both as to its organization and method or operation, together with further objects and advantages thereof, may best be understood by reference to the following description taken in connection with the accompanying drawing in which Fig. 1 is a sectional elevational view of a portion of a dynamoelectric machine provided with two thermally responsive snap disks arranged in accordance with our invention and with contacts of the two disks arranged in series; and Fig. 2 is a sectional elevational view of a dynamoelectric machine portion having two disk protectors in a series arrangement illustrating a modification.

Figure 2:
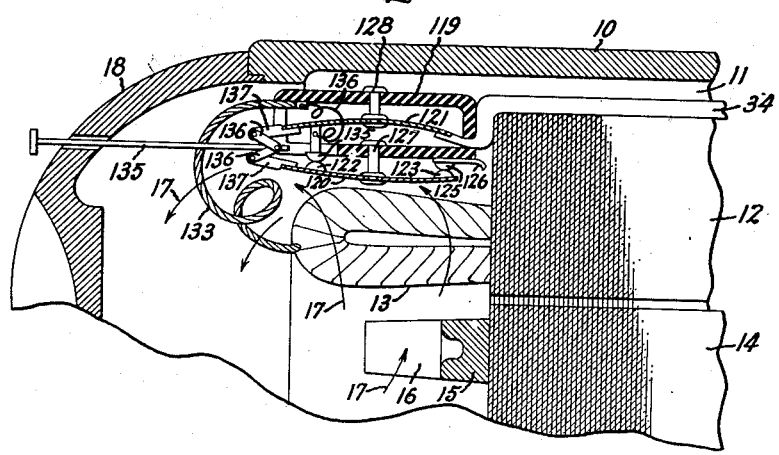

Referring now to Fig. 1, we have shown a portion of a dynamoelectric machine such as a motor provided with a frame 10 having ribs 11 and secured therein a dynamoelectric stator core portion 12. As is conventional, the core comprises a plurality of punchings provided with slots (not indicated) containing elements of a stator winding 13 for exciting the stator core which is arranged to react electrodynamically with a rotor core portion 14 which is assumed to be of the squirrel cage type provided with end rings such as 15 and integrally cast fan blades 16 adapted, with rotation of the rotor, to circulate ventilating medium as indicated by the arrows 17. The machine is provided with a conventional endshield 18. Secured to the endshield or the frame, or to one or more of the circumferentially spaced ribs 11, is a thermal detector support and casing 19 which may conveniently be made of Bakelite or other insulating material and is adapted to support two snap disk type thermal protectors, one a disk 20 supported in the stream of ventilating medium (as indicated by arrows 17) and the other a disk 21 substantially completely enclosed by casing 19 so as to be shielded from the ventilating medium. As will hereinafter become more apparent, disk 20 is provided to prohibit dangerous temperatures due to stalled conditions, and in order to render it inoperative it is cooled by the ventilating medium during running of the motor. The respective ends of disk 20 are provided with movable contacts 22 and 23 which cooperate with stationary contacts 24 and 25, respectively, mounted on portions of the casing 19. One of the stationary contacts (24) serves as a connection terminal to which one end of a supply bus or conductor 26 is attached. Each of the disks 20 and 21 has its center permanently secured, as by respective pins 27 and 28, to a fixed member such as casing 19. The thermally responsive disks each assume one position when "cold" (this position being the position shown in the drawing) and have relatively free ends which snap past center to another position when a predetermined temperature is reached.

As is apparent in Fig. 1, the disk 20, when in the "cold" or closed position shown, is adapted to convey current which is supplied through lead 26 and through the material of the disk itself. Contact 25 is connected through a metal current carrying strip 29 to a stationary contact 30 arranged to be contacted by a movable contact 31 mounted on the free end of a leaf spring member 32 interconnected through a lead 33 to supply current to the winding 13. The arrangement is such that the resilience of spring member 32 tends to urge contacts 30 and 31 out of engagement but this spring force is overcome by the normally dished (i. e. "cold") position of disk 21. This disk 21 serves, as hereinafter more fully explained, to prohibit dangerous temperature due to running overloads, and so it may be found desirable to shield it by a portion of the case 19 from the flow of ventilating medium as shown. Disk 21 is arranged in good heat conducting relationship with a heat conducting bar 34, which may be made of copper and which passes into the core portion 12 remote from the winding 13 and passes in contact with the core for some distance. If desired, this bar might terminate in the winding itself to serve as one of the current supplying leads therefor, in which case the disk might be arranged to be to some extent current responsive but we prefer to disassociate the line current from this disk and from the thermal bar which heats it, particularly since it is desirable that the thermal bar 34 be a bare bar so that it may be in direct contact with the core and not insulated therefrom as would be the case if it were a current carrying member.

With the arrangement described above we have provided that one of the disks will be responsive to stator core heat and the other disk responsive to motor current primarily only during locked rotor, starting or low speed conditions, during which it is not cooled to any great extent by the ventilating air. In order to understand the operation, it may be assumed that both disks are in the normal "cold" position shown in Fig. 1, and in which position they will allow the motor to start and to run. In this position the disk 20 interconnects its movable and stationary contacts so that current flows through this disk and through the strip 29 and through contacts 30 and 31 to the winding 13. If an excessive running overload occurs, at a suitable selected temperature thermal disk 21 will snap through center permitting the contact 31 attached to spring 32 to break the circuit. In accordance with the illustrated embodiment of the invention, this disk is protected from the ventilating medium ambient and is primarily responsive to temperature of the stator magnetic core. Since under stalled conditions the core temperature does not reasonably follow the very excessive stalled input (due to thermal lag) the other thermal disk 20 is provided and the motor current is passed through this disk which itself has a suitable resistance to current flow so it will generate heat in the disk sufficient, at a predetermined overload, to snap it through center and open its contacts if the stalled condition persists long enough to result in dangerous motor temperatures. As already explained, after the motor comes up to a reasonable speed the motor ventilating air flows around this disk 20, cooling it so that it is basically inoperative.

Referring now to Fig. 2 which is a sectional view of a portion of a dynamoelectric machine with like parts like numbered as in Fig. 1, a different type of mounting and shielding bracket 119 is used for mounting two disks, one an exposed disk 120 mounted on the outside of the bracket and the other a partially shielded disk 121 mounted within the bracket. The respective ends of disk 120 are provided with movable contacts 122 and 123, and the two disks are mounted in opposed relation so that a contact at one end of each disk will, for the closed position, mate with a contact of the other. Thus contact 122 is designed to mate with a movable contact 135 carried by disk 121. The other movable contact (123) of the exposed disk mates with a stationary contact 125 to which, in the illustrated embodiment, a supply conductor 126 is attached. The disks are mounted on respective center pins 127 and 128, and contact 135 of disk 121 is connected as by a pigtail 136 with a lead 133 for conducting current to the motor winding 13. Thus, as before, one disk and only one disk carries current through the disk material itself, the other disk (21 or 121) being arranged in good heat conducting relation with the core material as by its mechanical connection to a heat conducting bar 34. With the embodiment illustrated in Fig. 1, it is assumed that after an overload the circuit breaking disk will automatically reset when the condition is improved, but in connection with the embodiment of Fig. 2 we have shown manual reset means taking the form of a hand operated sliding push rod 135 passing through end shield 18 and terminating inside the machine in a pair of rotatable toggles 136 operating dogs 137 connected to snap back the disks to the contact closed position with movement of rod 135 so that the disks (of Fig. 2) may be constructed so that they will not snap back to the cold position of their own volition, but only when manually forced closed, thus to adequately protect equipment which should not be automatically reenergized after a fault. In Fig. 2, as in Fig. 1, the starting disk is in the path of the ventilating medium and the running disk is thermally connected to the stator core. The arrangement of either Fig. 1 or Fig. 2 has all the advantages of the invention of diminishing design limitations because starting and running protections are disassociated so that the running disk (21 or 121) may be made common to many machines, for example, over a considerable range of motor ratings since it is responsive to motor heat alone and not directly affected by motor current.

Since the stator core temperature of a motor or generator responds quite rapidly to overload conditions, and the invention presupposes that such heat will be directly transmitted (as by a copper bar) to the running protector, adequate means are provided for affording complete running protection while, at the same time, running protection is not adversely affected by momentary high values of current during starting, and in addition variations in line voltage (which affect motor current) need have no effect upon the running protection afforded. There is a further advantage, with the arrangements of the invention, in that the starting disk (20 or 120) is not critical because there is a large ratio of normal starting current to running current (approximately 3 to 1 on most motors, or 9 to 1 in heating value) so that again a single type disk can be used for a large range of ratings. Further, with the arrangements of the invention, the physical arrangement is advantageous in utilizing available space as well as providing ideal operating conditions for a protective arrangement.

While we have illustrated and described particular embodiments of our invention, modifications will occur to those skilled in the art. We desire it to be understood, therefore, that our invention is not to be limited to the particular arrangement disclosed, and we intend in the appended claims to cover all modifications which do not depart from the true spirit and scope of our invention.

What we claim as new and desire to secure by Letters Patent of the United States is:

1. In an overload protection system for a dynamoelectric machine having a stator core and a stator winding and adapted when running to circulate a ventilating medium, thermal responsive means for interrupting the supply of current to said stator winding comprising a first thermal switch arranged to be responsive to said current and arranged physically in the path of said ventilating medium to be cooled thereby, whereby said first thermal switch is effective to interrupt said current supply when said ventilating medium is not circulating, and a second thermal switch arranged in heat exchanging relation with said stator core for operating on overload during running after the time required to heat said core from said winding and said second thermal switch from said core, said thermal switches having contacts with the contacts of one arranged electrically in circuit with the contacts of the other and in circuit with said stator winding.

2. In an overload protection sytem for a dynamoelectric machine having a stator core and a stator winding and adapted when running to circulate a ventilating medium, thermal disk means for interrupting the supply of current to said stator winding comprising a first thermal disk arranged to be responsive to said current and arranged in the path of said ventilating medium to be cooled thereby, said first thermal disk being effective to interrupt said current supply when said ventilating medium is not circulating, a second thermal disk substantially shielded from said ventilating medium, and a bar of heat conductive material contacting said second disk and arranged in good heat exchanging relation with said core, said thermal disks each having contacts with the contacts of one arranged in circuit with the contacts of the other and in circuit with said stator winding.

3. In an overload protection system for a dynamoelectric machine having a ventilating circuit and a stator core and winding, the combination of two thermal disks having contacts in circuit with said winding, one of said disks being arranged in the circuit of said ventilating medium and arranged to operate responsive to overload values of current through said contacts when not cooled by said ventilating medium, and the other of said disks being provided with a copper strap arranged in good thermal contact with said disk and with said stator core, and means for shielding said second disk from said ventilating medium to render said second disk responsive primarily to core heat, whereby said second disk prohibits dangerous temperatures due to running overloads and said first disk prohibits dangerous temperatures due to stalled conditions.

4. A dynamoelectric machine having a squirrel cage rotor and a stator core having a winding, and two thermal responsive snap disk protectors, each having contacts associated with the electrical circuit of said winding, with the first of said disks arranged to be responsive to current values in said circuit and to be cooled during the running of said motor thereby to render it inoperative, and the second of said disks being provided with means for shielding the same from ambient temperature in said dynamoelectric machine and also provided with means comprising a heat conducting bar connecting said disk with said core to render said disk responsive to the temperature of said core, whereby the first of said disks will operate responsive to stalled overload and the second of said disks will operate primarily responsive to running overload.

5. In a dynamoelectric machine having a squirrel cage rotor, a stator core having a winding, and means for distributing ventilating medium thereabout, the combination of first and second thermal responsive snap disk protectors having contacts and mounted in opposed relation so that a contact of said first disk is designed to mate with a contact of said second disk, means for mounting said first disk in the path of said ventilating, medium, thermal shielding means comprising a casing of insulating material substantially enclosing said second disk from the path of said ventilating medium, heat conducting means comprising a metal bar arranged to make said second disk responsive to heat in said stator core, and circuit completing means including connections for supplying current to said winding through said contacts of said first and second disks and through the material of said first disk.

6. An overload protection system for use with an electric motor having an energizing winding comprising a pair of thermal responsive switches in series with said winding for interrupting the supply of current therethrough, the first of said thermal switches being positioned in the path of the ventilating medium to be cooled thereby, said first switch being directly responsive to the flow of current through said winding and inversely responsive to the rate of circulation of said ventilating medium through said motor, and the second of said thermal switches being directly responsive to the flow of current through said winding and independent of the rate of circulation of said ventilating medium.

References Cited in the file of this patent

UNITED STATES PATENTS

| Number | Name | Date |
|---|---|---|
| 2,279,214 | Veinott | Apr. 7, 1942 |
| 2,338,515 | Johns | Jan. 4, 1944 |